US012586234B2

(12) United States Patent　　　　　　(10) Patent No.:　US 12,586,234 B2
Nakamichi　　　　　　　　　　　　　　(45) Date of Patent:　Mar. 24, 2026

(54) DETECTION DEVICE DETECTING GAZE POINT OF USER, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Saki Nakamichi, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 444 days.

(21) Appl. No.: 17/946,099

(22) Filed: Sep. 16, 2022

(65) Prior Publication Data

US 2023/0092593 A1　　Mar. 23, 2023

(30) Foreign Application Priority Data

Sep. 21, 2021　(JP) ................................. 2021-153365

(51) Int. Cl.
　　*G06T 7/73*　　　(2017.01)
　　*G06F 3/01*　　　(2006.01)
　　*G06V 40/18*　　(2022.01)
(52) U.S. Cl.
　　CPC ............... *G06T 7/73* (2017.01); *G06F 3/013* (2013.01); *G06V 40/193* (2022.01)
(58) Field of Classification Search
　　CPC ......... G06T 7/73; G06F 3/013; G06V 40/193; G06V 40/19; G02B 27/0172;
(Continued)

(56) References Cited

U.S. PATENT DOCUMENTS 11,403,757 B2* 　8/2022　Yan ........................ G06T 7/0012
2018/0039327 A1* 　2/2018　Noda ..................... H04N 23/64
(Continued)

FOREIGN PATENT DOCUMENTS

JP　　H06034874 A　　2/1994
JP　　2005198743 A　　7/2005
(Continued)

OTHER PUBLICATIONS

Hooge, I.T.C., Niehorster, D.C., Hessels, R.S. et al. The pupil-size artefact (PSA) across time, viewing direction, and different eye trackers. Behav Res 53, 1986-2006 (2021). (Year: 2021).*

(Continued)

*Primary Examiner* — Ming Shui
(74) *Attorney, Agent, or Firm* — Cowan, Liebowitz & Latman, P.C.

(57)　　　　　　ABSTRACT

A detection device capable of detecting an actual pupil center with high accuracy even in an off-axis sight line detection. The detection device includes an obtainment unit configured to obtain an image of an eyeball of a user, a memory device that stores a set of instructions, and at least one processor that executes the set of instructions to: detect a position of a pupil center of the eyeball from an image obtained by the obtainment unit, detect a direction of a sight line based on the position of the pupil center, and detect a gaze point of the user based on the position of the pupil center and an angle formed between an optical axis of the obtainment unit and the direction of the sight line.

10 Claims, 11 Drawing Sheets

(58) Field of Classification Search
CPC .. G03B 2213/025; H04N 23/53; H04N 23/63;
H04N 23/55
See application file for complete search history.

(56) References Cited

U.S. PATENT DOCUMENTS

| | | | |
|---|---|---|---|
| 2019/0130297 A1 | 5/2019 | Linden | |
| 2019/0243448 A1* | 8/2019 | Miller ................ | G02B 27/0172 |
| 2020/0326777 A1* | 10/2020 | Shoushtari ......... | G02B 27/0093 |

FOREIGN PATENT DOCUMENTS

| | | | | | |
|---|---|---|---|---|---|
| JP | 2011217764 A | | 11/2011 | | |
| JP | 2015-126850 A | | 7/2015 | | |
| JP | 2018099174 A | * | 6/2018 | .............. | A61B 3/11 |
| JP | 2019168954 A | | 10/2019 | | |
| JP | 2021-064928 A | | 4/2021 | | |

OTHER PUBLICATIONS

Pupil Center as a Function of Pupil Diameter, Zaheer Ahmed, et al.
(Year: 2016).*
Feb. 10, 2025 Japanese Office Action, which is enclosed without an
English Translation, that issued in Japanese Patent Application No.
2021-153365.

* cited by examiner

FIG. 6

X-AXIS DIRECTION

Z-AXIS DIRECTION

Y-AXIS DIRECTION

REAL PUPIL CENTER COORDINATE

PUPIL IMAGE

IRIS IMAGE

CORRECTION VALUE v1

VIRTUAL PUPIL CENTER COORDINATE
ESTIMATED FROM IMAGE

REAL PUPIL CENTER COORDINATE

PUPIL IMAGE

IRIS IMAGE

CORRECTION VALUE v1

VIRTUAL PUPIL CENTER COORDINATE
ESTIMATED FROM IMAGE

DETECTION DEVICE DETECTING GAZE POINT OF USER, CONTROL METHOD THEREFOR, AND STORAGE MEDIUM STORING CONTROL PROGRAM THEREFOR

BACKGROUND OF THE INVENTION

Field of the Invention

The present invention relates to a detection device that is mountable on an image pickup apparatus like a camera and that detects a gaze point of a user, a control method therefor, and a storage medium that stores a control program therefor.

Description of the Related Art

There are some conventional cameras and video cameras that have a sight-line detection function that can detect a user's sight line direction. The detected sight line direction can be used to select a distance measurement point, for example. Moreover, also in a technical field of XRs, such as VR (virtual reality) and AR (augmented reality), a head mounted display that has the sight-line detection function has been practically used.

Many of electronic apparatuses (devices) that have such a sight-line detection function employ a sight-line detection system in which an optical axis of a sight-line detection optical system that detects a user's sight line does not match a user's actual sight line. This system is generally called as an "off-axis sight line detection". In the off-axis sight line detection, a sight line sensor of the sight-line detection optical system is arranged at an oblique lower side of a user's eyeball. Then, when the sight line is detected, the sight line sensor picks up an image of the user's eyeball from the oblique lower side, and a coordinate of a pupil center is detected from this image. For example, Japanese Laid-Open Patent Publication (Kokai) No. 2015-126850 (JP 2015-126850A) discloses a technique that finds a coordinate of a pupil center by approximating a shape of a pupil detected from an image of an eyeball to an ellipse.

However, the image of the eyeball obtained by the off-axis sight line detection of the prior art disclosed in the above-mentioned publication is distorted because of the influence of perspective. Accordingly, even if the shape of the pupil is approximated to the ellipse, this ellipse is still affected by the perspective. Then, it becomes difficult to find the coordinate of the pupil center with high accuracy from the ellipse that is affected by the perspective.

SUMMARY OF THE INVENTION

The present invention provides a detection device, a control method therefor, and a storage medium storing a control program therefor, which are capable of detecting an actual pupil center with high accuracy even in the off-axis sight line detection.

Accordingly, an aspect of the present invention provides a detection device including an obtainment unit configured to obtain an image of an eyeball of a user, a memory device that stores a set of instructions, and at least one processor that executes the set of instructions to: detect a position of a pupil center of the eyeball from an image obtained by the obtainment unit, detect a direction of a sight line based on the position of the pupil center, and detect a gaze point of the user based on the position of the pupil center and an angle formed between an optical axis of the obtainment unit and the direction of the sight line.

According to the present invention, the actual pupil center is detectable with high accuracy even in the off-axis sight line detection.

Further features of the present invention will become apparent from the following description of exemplary embodiments with reference to the attached drawings.

BRIEF DESCRIPTION OF THE DRAWINGS

FIG. 6 is a view showing optical paths of a case where a user's sight line is detected using a sight-line detection function of the camera according to the embodiment.

DESCRIPTION OF THE EMBODIMENTS

Hereafter, embodiments according to the present invention will be described in detail by referring to FIG. 1 to FIG. 11B. However, a configuration described in the following embodiments is just an example, and the scope of the present invention is not limited to the configuration described in the embodiments. This embodiment shows an example in which a detection device of the present invention is applied to a camera. Thereby, the camera has a sight-line detection function.

Moreover, the detection device is applicable to a device (an electronic apparatus) that displays information, including an image, a character, etc., for example. Such an electronic apparatus may be a cellular phone, a game machine, a tablet terminal, a personal computer, an information terminal of a clock type or a glasses type, a head mounted display, a binocular, etc.

Figure 1A:
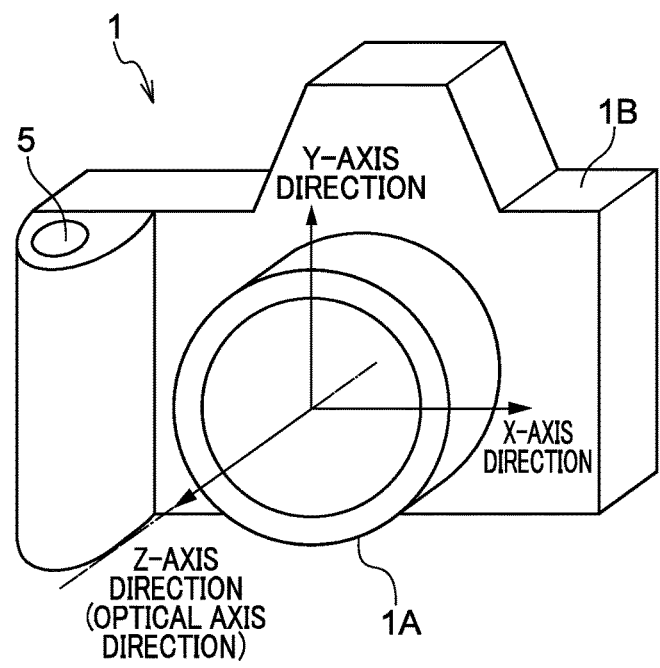
FIG. 1A and FIG. 1B are respectively a front perspective view and a back perspective view showing an external appearance of a camera according to an embodiment.

As shown in FIG. 1A, the camera 1 is a lens exchangeable digital still camera and has an image pickup lens unit 1A and a camera body 1B, for example. In the following description, a width direction and a height direction of the camera body 1B shall be an X-axis direction and a Y-axis direction, respectively, and an optical axis direction of the image pickup lens unit 1A shall be a Z-axis direction. The camera body 1B has a release button 5 arranged on its front upper part. The release button 5 is an operation member that receives an image pickup operation from a user who is a photographer.

Figure 1B:
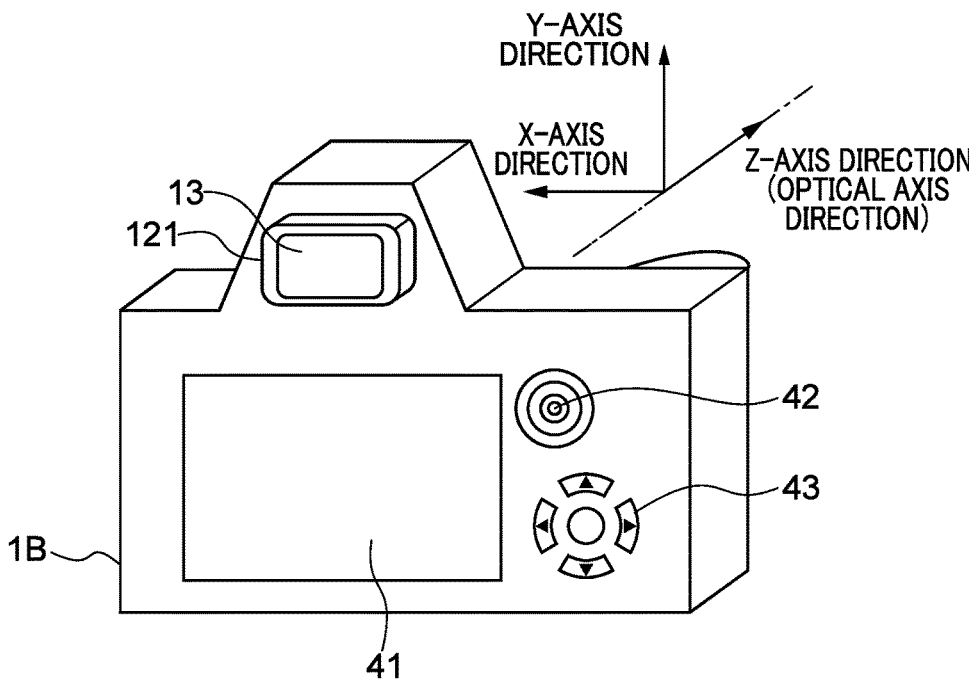
Figure 3:
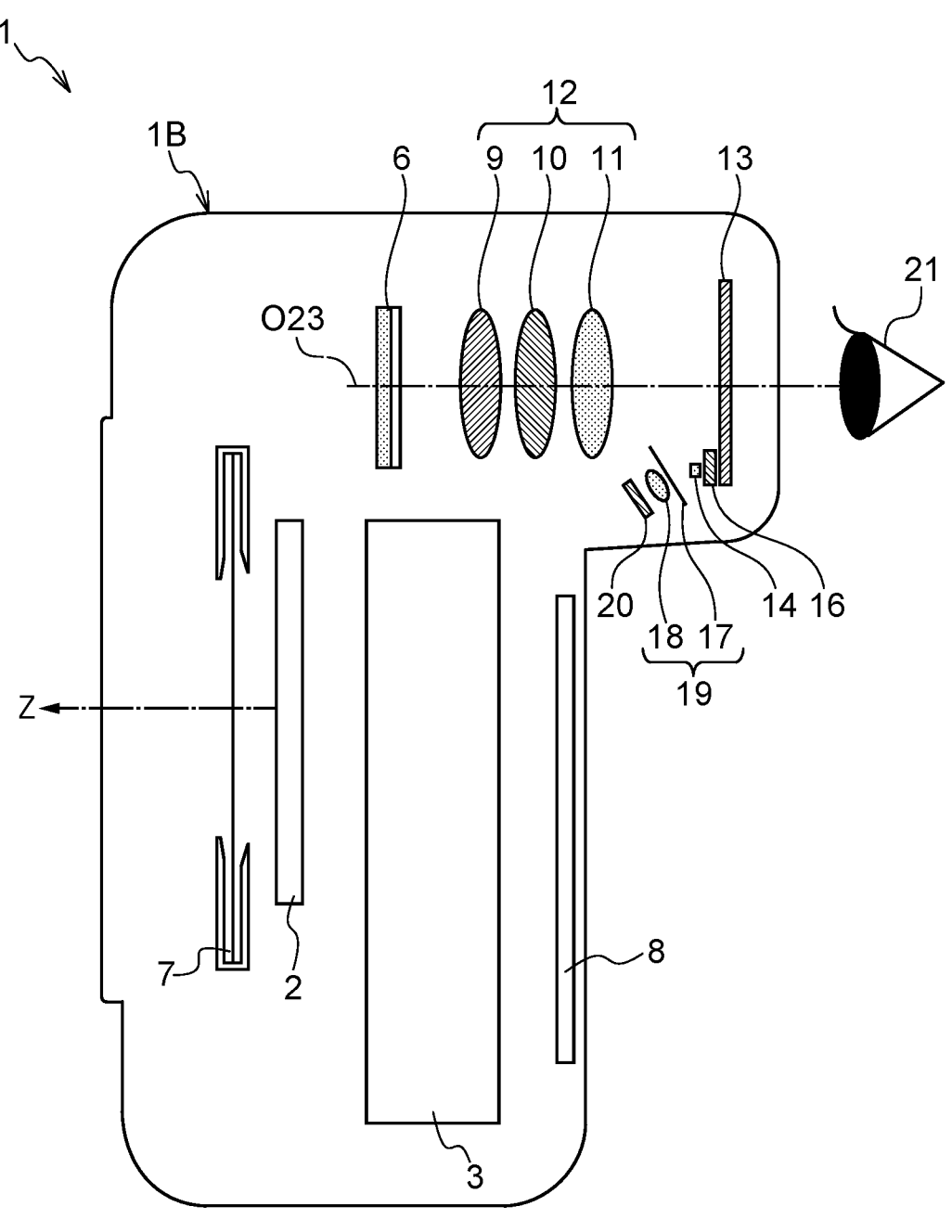
FIG. 3 is a sectional side view showing an internal structure of the camera according to the embodiment.
Figure 4:
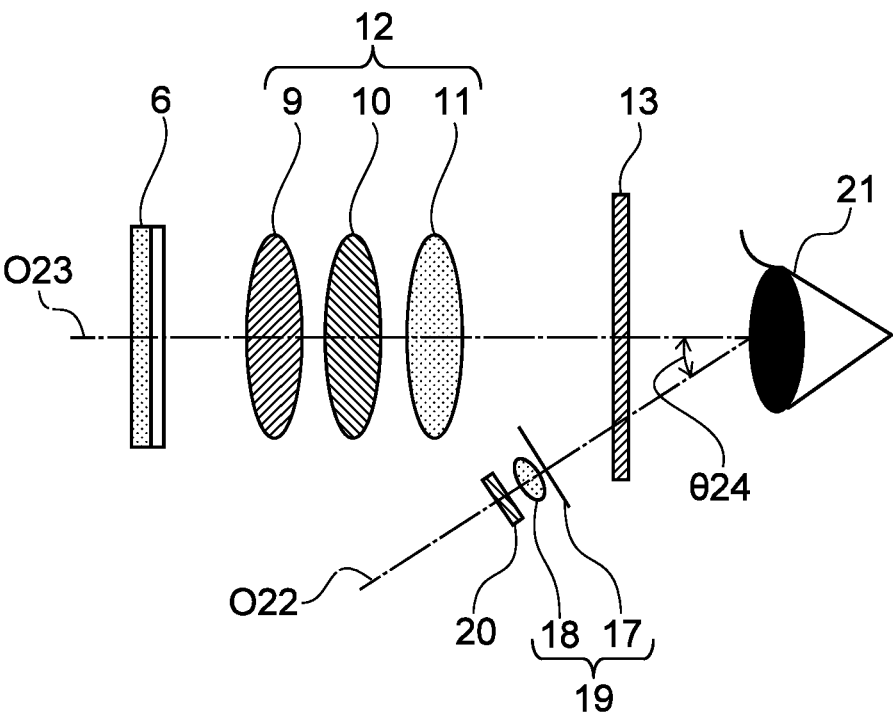
FIG. 4 is a schematic view describing an angle between a user's sight line and an optical axis of a sight-line detection optical system of the camera according to the embodiment.

As shown in FIG. 1B, the camera body 1B has an eyepiece window frame 121, operation members 41, 42, and 43 that are arranged on its backface. A viewing window 13 is formed in the eyepiece window frame 121 and is projected outward (backface side) from the camera body 1B. The user can look into the viewing window 13 and can visually confirm a first display panel (display device) 6 (FIG. 3). The operation member 41, 42, and 43 receive various operations from the user. The operation member 41 is a touch panel that receives a touch operation. Moreover, the operation member 41 has a display panel that consists of a liquid crystal panel on which an image can be displayed. Markers showing directions are attached to the operation member 42. The operation member is an operation lever that can be pushed down in directions of the markers. The operation member 43 includes four direction keys that can be pushed in four directions.

Figure 2:
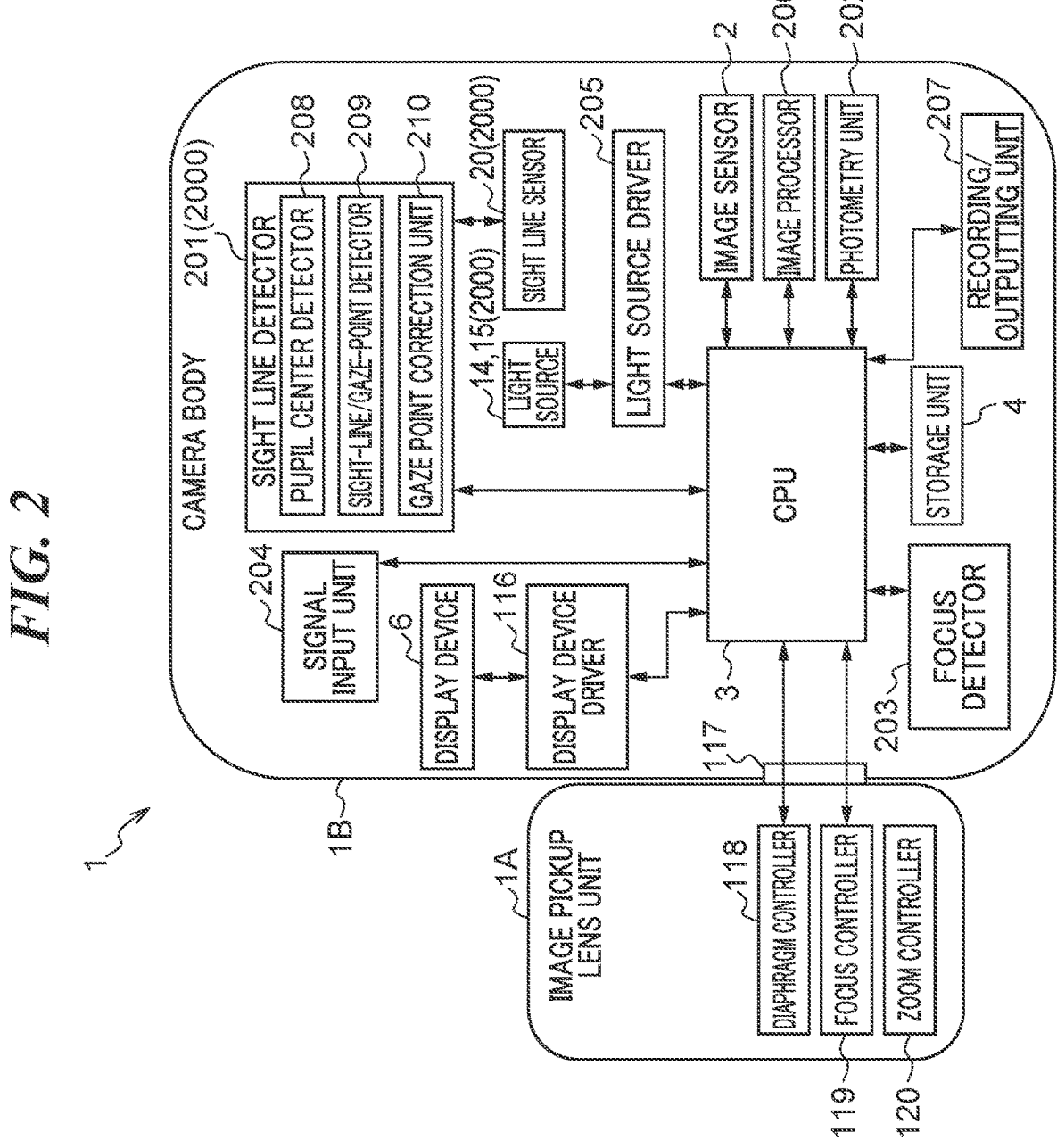
FIG. 2 is a block diagram showing a configuration of the camera according to the embodiment.

As shown in FIG. 2, the image pickup lens unit 1A has an optical system (not shown) including a zoom lens, a focusing lens, a diaphragm, etc., a diaphragm controller 118, a focus controller 119, and a zoom controller 120. The image pickup lens unit 1A guides a light beam from an object to an image sensor 2 in the camera body 1B in a state equipped to the camera body 1B and forms an object image on an image pickup surface of the image sensor 2. The diaphragm controller 118, focus controller 119, and zoom controller 120 receive instruction signals from a CPU 3 in the camera body 1B through a mount contact section 117 and drivingly control the diaphragm, focusing lens, and zoom lens, respectively.

The camera body 1B has the image sensor 2, such as a CCD sensor or a CMOS sensor. The image sensor 2 photoelectrically converts the optical image formed on the image pickup surface of the image sensor 2 by the optical system of the image pickup lens unit 1A and outputs an analog image signal obtained to an A/D converter (not shown). The A/D converter converts an analog image signal into a digital signal and outputs it as image data. The camera body 1B has the CPU 3 and a storage unit 4 including a ROM, a RAM, etc. The CPU 3 reads a control program for each block (each section) of the camera body 1B from the ROM of the memory unit 4, develops it to the RAM of the storage unit 4, and runs it. Thereby, the CPU 3 controls an operation of each block of the camera body 1B. In this embodiment, image pickup signals from the image sensor 2 and a sight line sensor 20 can be stored in the storage unit 4. Moreover, a program by which the CPU 3 as a computer executes each block of the camera 1 is also stored in the storage unit 4. The program is used to execute a control method to control a detection device.

The camera body 1B has a sight line detector (detection unit) 201, a photometry unit 202, a focus detector 203, a signal input part 204, a light source driver 205, an image processor 206, a recording/outputting unit 207, and a display device driver 116, which are electrically connected to the CPU 3. The sight line detector 201 is mentioned later. The photometry unit 202 applies processes, such as amplification, logarithmic compression, and A/D conversion, to the signal specifically a luminance signal corresponding to brightness of a field, obtained from the image sensor 2 that also has a function as a photometry sensor, and sends the processing result as field luminance information to the CPU 3.

The focus detector 203 converts analog signal voltages from detection elements (pixels) used for phase difference detection included in the image sensor 2 (CCD) into digital signals, and sends them to the CPU 3. The CPU 3 calculates distances to objects corresponding to focus detection points from the signals of the detection elements. This is a well-known technique known as imaging plane phase difference AF (autofocus). In this embodiment, as an example, the viewing window 13 of the eyepiece window frame 121 (i.e., a visual field image in a finder (a visual recognition image)) is divided into 180 sections, and a focus detection point shall be arranged at each of the divided 180 sections on the image pickup surface of the image sensor 2.

A switch SW1 that turns ON by a first stroke of the release button 5 for starting photometry, distance measurement, a sight-line detection operation, etc. of the camera 1 and a switch SW2 that turns ON by a second stroke of the release button 5 for starting an image pickup operation are connected to the signal input unit 204. ON signals from the switch SW1 and switch SW2 are input into the signal input part 204 and are transmitted to the CPU 3.

Moreover, the signal input unit 204 also receives operational input from the operation members 41, 42, and 43. The image processor 206 applies various image processes to the image data stored in the RAM of the storage unit 4. For example, there are various image processes that develop, display, and record digital image data, such as a process to correct defect of pixels resulting from errors of the optical system of the image pickup lens unit 1A and image sensor 2, a demosaicing process, a white balance correction process, a color interpolation process, and a gamma process. The recording/outputting unit 207 records the data including image data into a recording medium, such as a memory card that is attachable to the camera body 1B, and outputs such data to an external apparatus through an external interface.

As shown in FIG. 3, the camera body 1B has a shutter 7 arranged ahead of the image sensor 2 in the optical axis direction, a first display panel 6 arranged ahead of the viewing window 13, and a second display panel 8 arranged at the backface side of the camera body 1B. The first display panel 6 constitutes an EVF (Electronic View Finder). The first display panel 6 can display an image obtained by the camera 1 and can display a menu for operating the camera 1 and for appreciating and editing the image, for example. Moreover, the first display panel 6 bears a part of a function to detect the sight line of the user who looks into the viewing window 13. Then, this detection result is reflected to the control of the camera 1. The second display panel 8 can also display an image obtained by the camera 1 and can display a menu for operating the camera 1 and for appreciating and editing the image, for example.

The second display panel 8 consists of a liquid crystal panel with back light, an organic EL panels, or the like. It should be noted that the viewing window 13 is a transparent member that allows transmission of visible light. A user observes the image displayed on the first display panel 6 through the viewing window 13. Moreover, the camera body 1B has a lens group 12 arranged between the viewing window 13 and the first display panel 6. Although the lens group 12 consists of lenses 9, 10, and 11, the number of lenses is not limited to three.

As mentioned above, the camera 1 has the sight-line detection function. Hereinafter, this sight-line detection function is described. It should be noted that the "sight-line detection function" is a function to detect a sight line O23 of a user of the camera 1.

As shown in FIG. 2, the camera body 1B has a detection device 2000 mounted in its inside. The detection device 2000 has the sight line detector 201, the sight line sensor 20 that functions as an eye image sensor, and infrared LEDs 14 and 15 that function as light sources that irradiate a user's eyeball 21 with infrared light. The sight line detector 201 detects the sight line O23 of the user (a detection step). The sight line detector 201 converts an analog output of the sight line sensor 20 in a state where an eyeball image is formed on the sight line sensor 20 (i.e., an eye image (image) obtained by picking up the eyeball 21) into digital data and transmits the result to the CPU 3. The sight line detector 201 has a pupil center detector 208, a sight-line/gaze-point detector 209, and a gaze point correction unit 210.

The CPU 3 extracts feature points required for the sight-line detection from the eye image according to a predetermined algorithm mentioned later by operating the pupil center detector 208, sight-line/gaze-point detector 209, and gaze point correction unit 210. Then, the sight line O23 (the gaze point in the visual recognition image) of the user is detected from the positions of the feature points. It should be noted that the pupil center detector 208 detects a position of a pupil center c of the eyeball 21 from the image of the eyeball 21 (a pupil center detection step).

The sight-line/gaze-point detector 209 detects the direction of the sight line O23 and the position of the gaze point on the basis of the position of the pupil center c (using the position of the pupil center c) detected by the pupil center detector 208 (a sight-line/gaze-point detection step). In the description, the "gaze point" means the position at which the sight line O23 of the user is directed, i.e., means the position which the user is gazing at.

The gaze point correction unit 210 corrects the position of the gaze point on the basis of an angle θ24 (see FIG. 4) formed between an optical axis O22 of a sight-line detection optical system (an optical system) 19 mentioned below and the direction of the sight line O23 detected by the sight-line/gaze-point detector 209 (a gaze point correction step). Then, the corrected position can be treated as a real pupil center c.

Figure 5A:
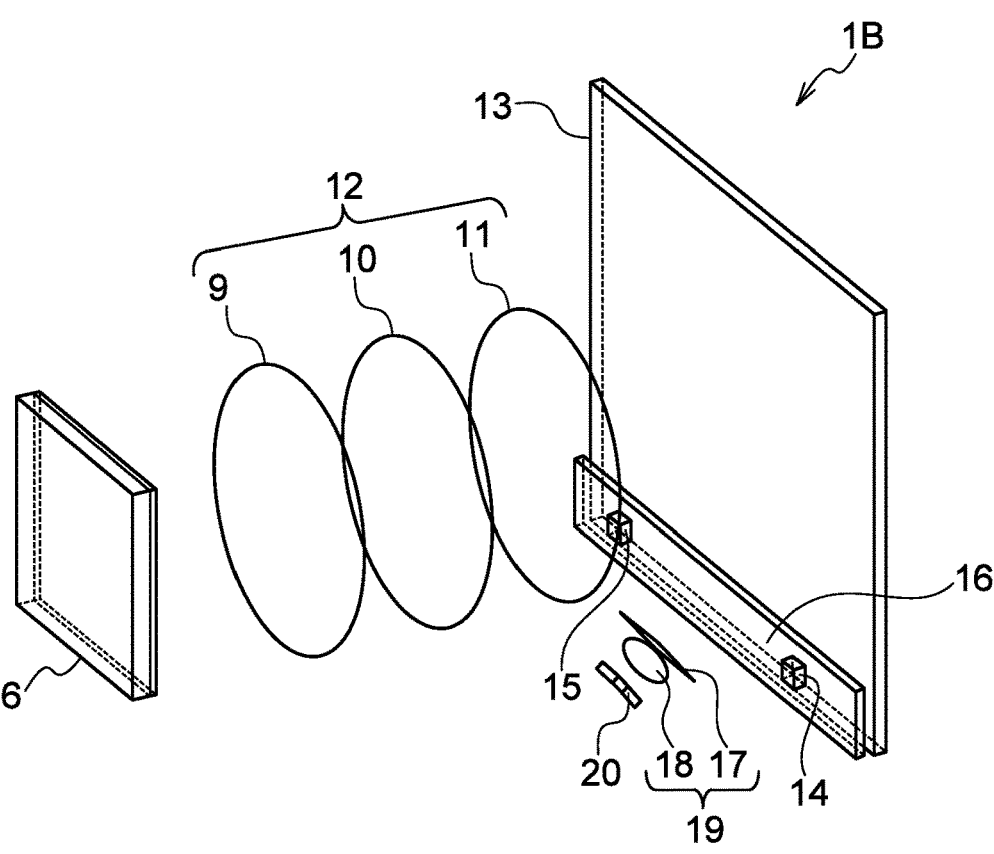
FIG. 5A is a perspective view showing a configuration of an EVF section of the camera according to the embodiment.
Figure 5B:
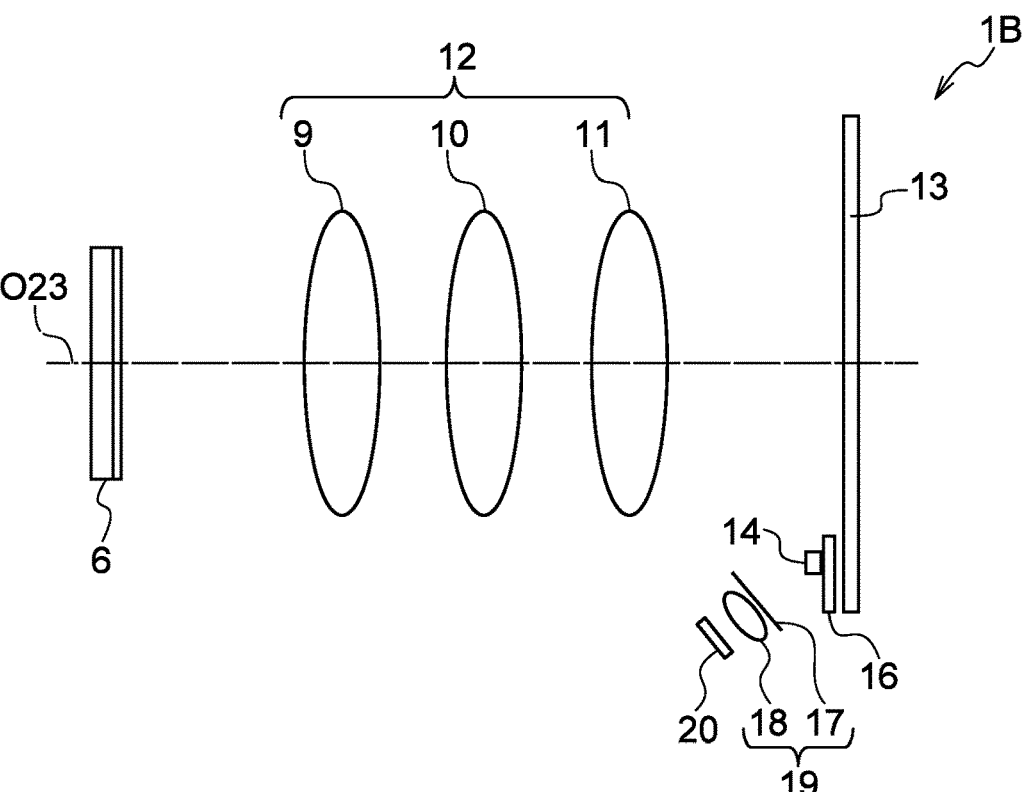
FIG. 5B is a sectional side view showing the configuration of the EVF section of the camera according to the embodiment.
Figure 6:
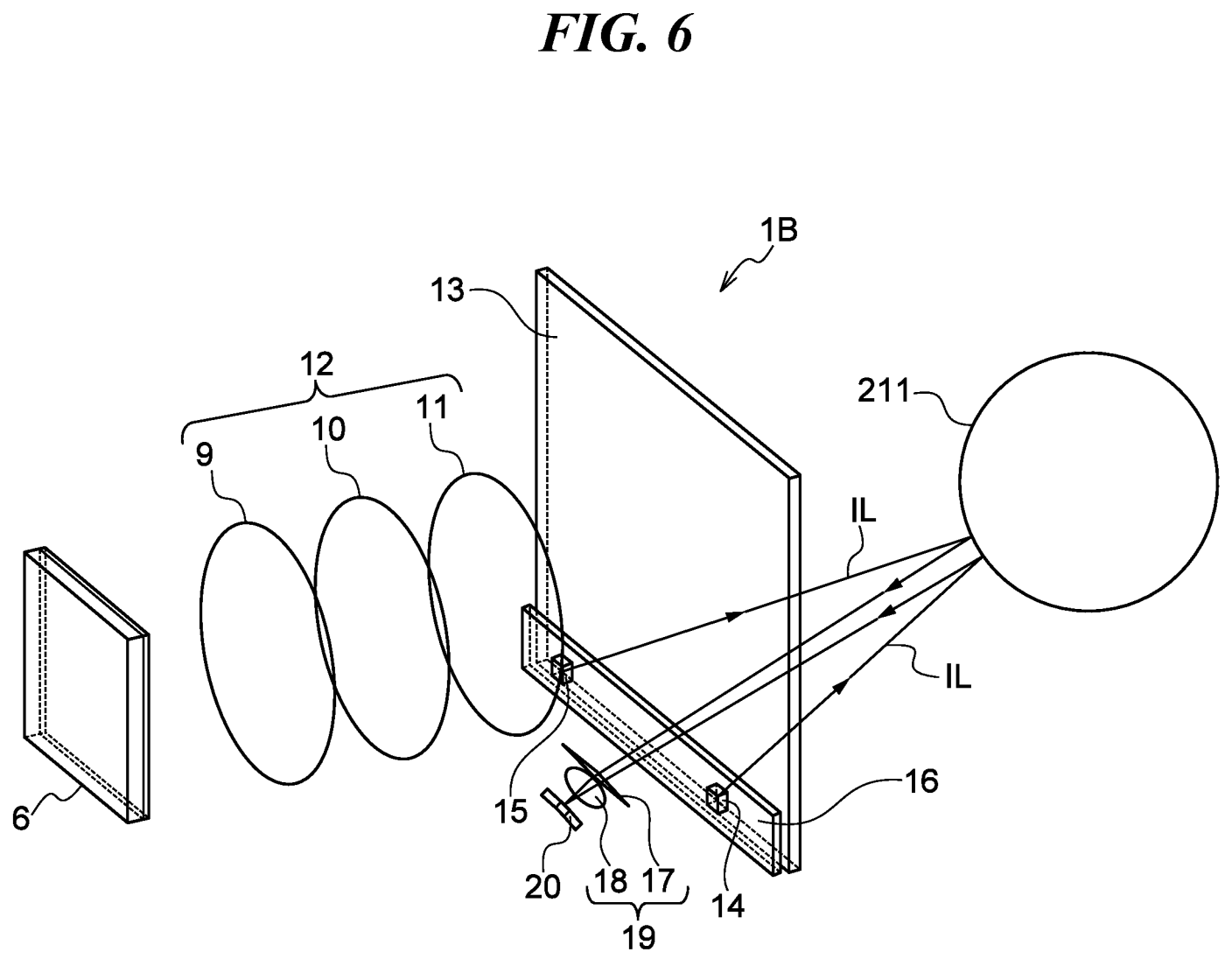

As shown in FIG. 5A, the infrared LEDs 14 and 15 are arranged at positions that enable to emit infrared light rays IL toward the viewing window 13. Thereby, as shown in FIG. 6, the infrared light rays IL from the infrared LEDs 14 and 15 transmit through the viewing window 13 and irradiate the eyeball 21 of the user. For the sight-line detection, a corneal reflection image formed by the infrared light rays that are specularly reflected by a cornea 211 is also used together with the eyeball image based on the infrared light irradiation. Moreover, an illumination window 16 is arranged between the infrared LEDs 14 and 15 and the viewing window 13. The illumination window 16 regulates visual recognition of the infrared LEDs 14 and 15 from the user side, i.e., hides the infrared LEDs 14 and 15. The illumination window 16 is made from resin material that absorbs visible light and allows transmission of the infrared light rays IL.

Moreover, the camera body 1B has the sight-line detection optical system 19. The sight-line detection optical system 19 has a diaphragm 17 and a sight-line imaging lens (lens) 18. The sight-line detection optical system 19 forms an image near the eyeball 21 on the sight line sensor 20. The sight line sensor (an obtainment unit) 20 is an image pickup unit that picks up (obtains) the image of the eyeball 21 of the user through the sight-line detection optical system 19 (an obtainment step). Thereby, the sight line detector 201 can detect the sight line O23 of the user from the image of the eyeball 21 obtained by the sight line sensor 20 (an obtainment step). It should be noted that the sight line sensor 20 consists of an image sensor, such as a CCD sensor or a CMOS sensor.

Figure 7:
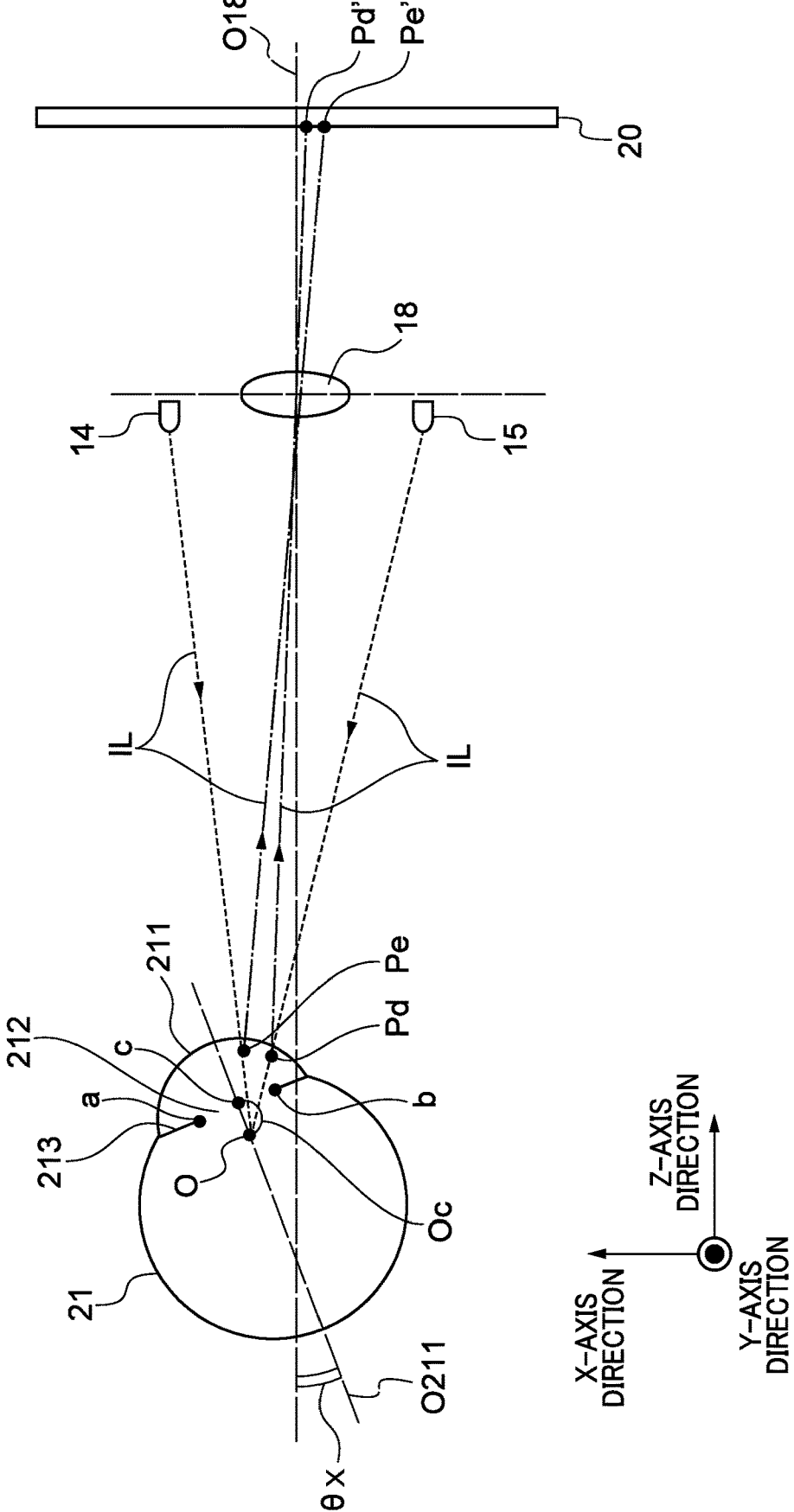
FIG. 7 is a schematic view describing a principle of the sight line detection of the camera according to the embodiment.

As shown in FIG. 7, the infrared LEDs 14 and 15 are arranged so as to be approximately symmetrical about an optical axis O18 of the sight-line imaging lens 18 and irradiate the cornea 211 of the eyeball 21 of the user with the infrared light rays IL (broken lines). Then, a part of infrared light rays IL (alternate long and short dash lines) reflected by the cornea 211 condenses to the sight line sensor 20 by the sight-line imaging lens 18. Thereby, the corneal reflection image mentioned above is obtained.

Figures 8A, 8B:
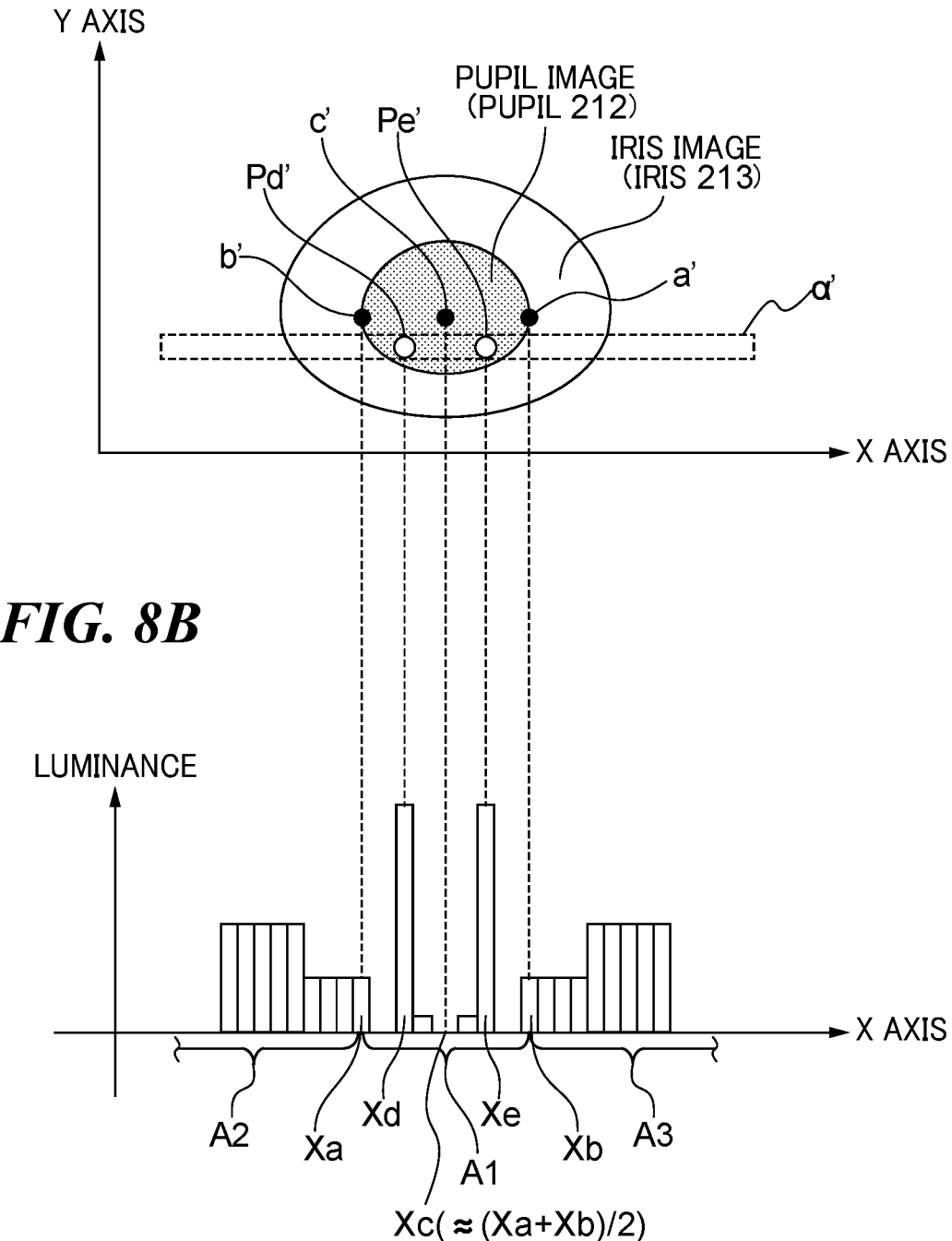
FIG. 8A is a schematic view showing an ocular image picked up by a sight line sensor of the camera according to the embodiment.
FIG. 8B is a graph showing output intensities (luminance distribution) output from the sight line sensor.

Generally, shapes of the pupil 212 and iris 213 of the eyeball 21 of a person are nearly circular. Accordingly, when the pupil 212 and iris 213 are picked up from the front, the images of the pupil 212 and iris 213 will be almost circular. However, since the sight line sensor 20 is arranged at the position where the eyeball 21 is looked up from an oblique lower side in the off-axis sight line detection, the images of the pupil 212 and iris 213 become downward swell (do not become circular) due to distortion as shown in FIG. 8A.

Figure 9:
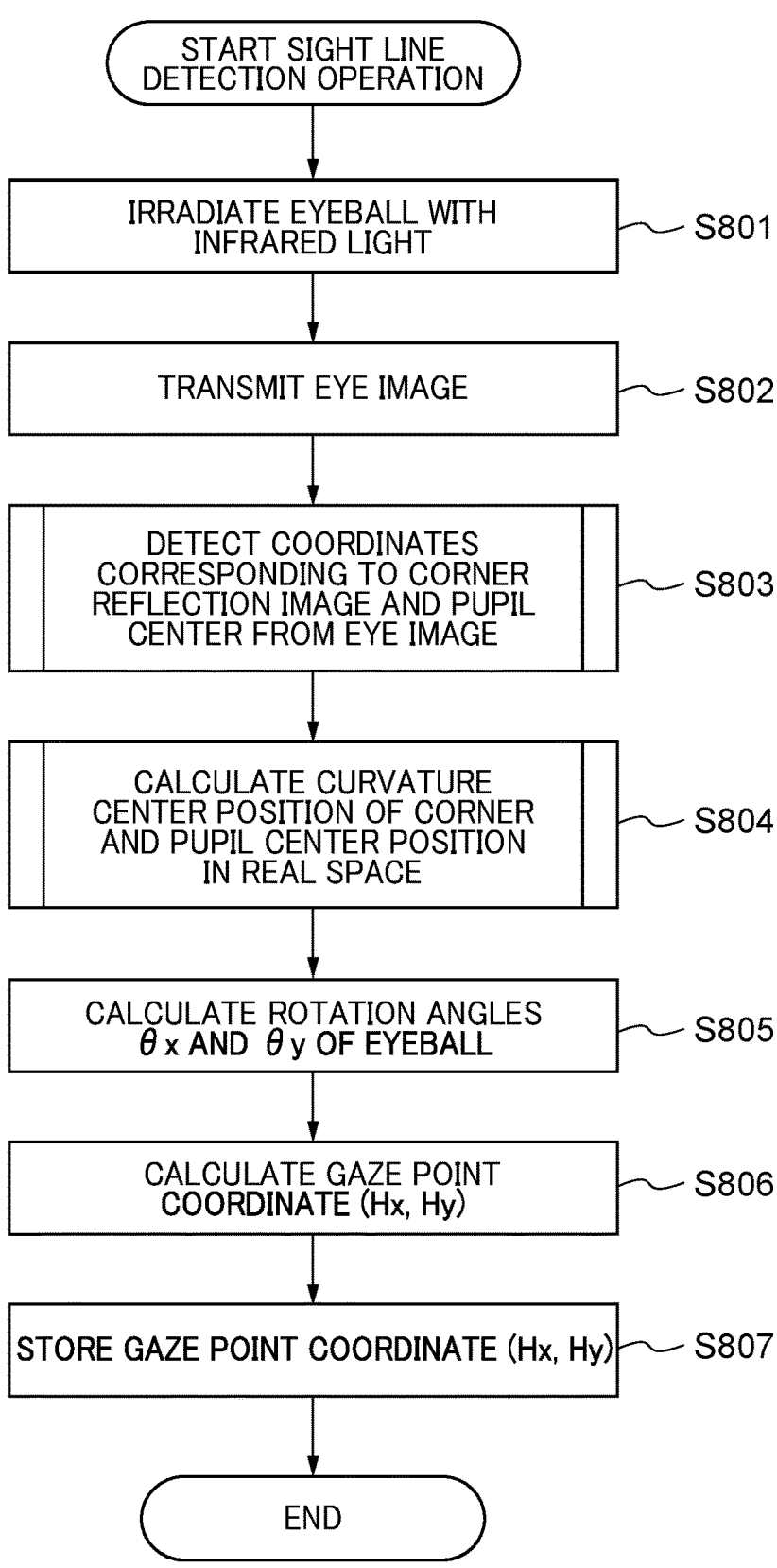
FIG. 9 is a flowchart showing a sight line detection program run with the camera according the embodiment.

A program of the sight-line detection operation that exhibits the sight-line detection function will be described by referring to a flowchart shown in FIG. 9.

When the sight-line detection program is started, processes in steps S801 and S802 are executed sequentially. In the step S801, the CPU 3 operates the infrared LEDs 14 and 15 through the light source driver 205 so that the infrared LEDs 14 and 15 will irradiate the eyeball 21 (cornea 211) of the user with the infrared light rays IL. As a result of the illumination of the infrared light rays IL, the eyeball image of the user is formed on the sight line sensor 20 through the sight-line imaging lens 18. Thereby, the eyeball image is photoelectrically converted by the sight line sensor 20, and an electrical signal (an eye image signal) of an eye image is obtained. In the step S802, the sight line detector 201 transmits the electrical signal of the eye image obtained by the sight line sensor 20.

Next, a step S803 is executed. In the step S803, the pupil center detector 208 calculates (computes) coordinates of points corresponding to a corneal reflection image Pd, a corneal reflection image Pe, and the pupil center c (see FIG. 7) from the eye image obtained in the step S802. The calculation process (subroutine) in this step S803 is mentioned later.

Next, a step S804 is executed. In the step S804, the pupil center detector 208 calculates (detects) the position of the curvature center O of the cornea 211 and the position of the pupil center c in the real space on the basis of the coordinates of the corneal reflection image Pd, corneal reflection image Pe, and pupil center c calculated in the step S803. The calculation process (subroutine) in this step S804 is mentioned later.

Next, a step S805 is executed. In the step S805, the sight-line/gaze-point detector 209 calculates a rotation angle θx of the optical axis O211 of the cornea 211 with respect to the optical axis O18 of the sight-line imaging lens 18 on the basis of the position of the curvature center O and the position of the pupil center c that are calculated in the step S804. When an average distance from the curvature center O to the pupil center c shall be Oc (see FIG. 7), the rotation angle θx within a ZX plane (a plane perpendicular to the Y-axis) can be denoted by the following formula (1).

$$Oc \cdot \sin \theta x \approx Xc - Xo \qquad (1)$$

The symbol Xc in the formula denotes the pupil center position in the real space, and the symbol Xo denotes the position of the curvature center of the cornea 211 in the real space. Moreover, a rotation angle θy of the cornea 211 within a ZY plane (a plane perpendicular to the X-axis) is also computable by a method similar to the calculation method of the rotation angle θx. Then, the direction prescribed by the rotation angles θx and θy is detected as the direction of the sight line O23 of the user.

Next, a step S806 is executed. In the step S806, the sight-line/gaze-point detector 209 detects (presumes) the gaze point of the user in the visual recognition image displayed on the first display panel 6 using the rotation angles θx and θy that are calculated in the step S805 (i.e., on the basis of the direction of the sight line O23). The coordinate (Hx, Hy) of the gaze point corresponding to the pupil center c is calculated by the following formulas (2) and (3).

$$Hx = m(Ax \cdot \theta x + Bx) \qquad (2)$$

$$Hy = m(Ay \cdot \theta y + By) \qquad (3)$$

The parameter m in the formulas (2) and (3) is a constant that is determined by the configuration of the sight-line detection optical system 19 (the sight-line imaging lens 18 etc.) of the camera 1. The parameter m is a conversion coefficient that is used to convert the rotation angles θx and θy into the coordinate corresponding to the pupil center in the visual recognition image. The parameter m is determined beforehand and shall be stored in the storage unit 4. The parameters Ax, Bx, Ay, and By are sight line correction parameters that correct individual difference of the sight line and are obtained by performing a predetermined calibration, respectively.

Moreover, the parameters Ax, Bx, Ay, and By shall be beforehand stored in the storage unit 4 before the sight-line detection program begins. The "predetermined calibration" is performed by highlighting several indices at different positions in a screen displayed on the first display panel 6 and by requiring a user to gaze the indices before an image pickup operation, for example. Then, the sight-line detection operation is performed whenever the user gaze each of the indices to calculate gaze points (presumed positions). The sight line correction parameters suitable for the user are found from the calculated gaze points and the coordinates of the indices. Such a technique is known as well-known technique (for example, see Japanese Laid-Open Patent Publication (Kokai) No. 2021-64928 (JP 2021-64928A)).

Next, a step S806 is executed. In the step S807, the sight line detector 201 stores the coordinate (Hx, Hy) of the gaze point in the storage unit 4. Thereby, the sight-line detection program is finished.

Next, the calculation process in the step S803 that calculates the coordinates of the points corresponding to the corneal reflection image Pd, corneal reflection image Pe, and pupil center c is described.

The infrared light rays IL emitted from the infrared LEDs 14 and 5 illuminate the cornea 211 of the user. At this time, the corneal reflection image Pd and the corneal reflection image Pe that are formed by parts of the infrared light rays IL reflected by the surface of the cornea 21 are imaged on the sight line sensor 20 through the sight-line imaging lens 18. Thereby, the corneal reflection image Pd and the corneal reflection image Pe (see FIG. 7) respectively become a corneal reflection image Pd' and a corneal reflection image Pe' in the eye image (see FIG. 8A). Similarly, the light rays from edges a and b of the pupil 212 (see FIG. 7) are also imaged on the sight line sensor 20 to form pupil edge images a' and b' (see FIG. 8A).

FIG. 8B shows luminance distribution (luminance information) in an area a' in the eye image shown in FIG. 8A in an X-axis direction of the eye image. The X-axis direction is a horizontal direction and a Y-axis direction is a vertical direction. In this embodiment, the coordinates of the corneal reflection images Pd' and Pe' in the X-axis direction (horizontal direction) shall be Xd and Xe, and the coordinates of the pupil edge images a' and b' shall be Xa and Xb. As shown in FIG. 8B, an extremely (remarkably) high luminance is obtained at the coordinate Xd of the corneal reflection image Pd' and the coordinate Xe of the corneal reflection image Pe'.

Moreover, a luminance that is extremely lower than the luminance at the coordinates Xd and Xe is obtained in an area A1 between the coordinates Xa and Xb, which is equivalent to the area of the pupil 212 (the area of the pupil image obtained by imaging the light rays from the pupil 212 on the sight line sensor 20), except for the coordinates Xd and Xe. Then, a middle luminance between the above-mentioned two luminances is obtained in the area of the iris 213 outside the pupil 212 (the area of the iris image outside the pupil image obtained by imaging the light rays from the iris 213).

Specifically, the middle luminance is obtained in an area A2 smaller than the coordinate Xa in the X-axis direction and an area A3 larger than the coordinate Xb. The coordinate Xd of the corneal reflection image Pd', the coordinate Xe of the corneal reflection image Pe', the coordinate Xa of the pupil edge image a', and the coordinate Xb of the pupil edge image b' can be obtained from such luminance distribution. Specifically, the X coordinates at which the luminance is extremely high (highest) are obtained as the coordinate Xd of the corneal reflection image Pd' and the coordinate Xe of the corneal reflection image Pe'. Moreover, the X coordinates at which the luminance is extremely lower than the luminance at the coordinates Xd and Xe are obtained as the coordinate Xa of the pupil edge image a' and the coordinate Xb of the pupil edge image b'.

Then, the whole area of the eye image can be scanned by moving the area a' in the Y-axis direction. Thereby, the edge coordinate group of the pupil image can be obtained. The pupil center detector 208 detects a coordinate (position) of a luminance gravity center of the edge coordinate group in the eye image (image) as a coordinate (position) of a temporary pupil center c'. The coordinate of the pupil center c' is a provisional coordinate of the pupil center c that is a detection target of the pupil center detector 208. A coordinate Xc in FIG. 8B is a coordinate of the of pupil center c' in the X-axis direction and is approximated to (Xa+Xb)/2.

Next, the calculation process in the step S804 that calculates the positions of the curvature center O of the cornea 211 and the pupil center c in the real space is described. The pupil center detector 208 calculates an image formation magnification β of the sight-line detection optical system 19. The image formation magnification β is determined by the relative position of the eyeball 21 to the sight-line imaging lens 18 and can be found using a function of the distance |Xd–Xe| between the corneal reflection image Pd' and corneal reflection image Pe'. Then, the positions of the curvature center O of the cornea 211 and the pupil center c in the real space are computable by multiplying the image formation magnification β to image height. In this way, the pupil center detector 208 in the sight line detector 201 is constituted so that the positions of the curvature center O of the cornea 211 and the pupil center c can be detected from the eye image (the image of the eyeball 21).

Figure 10A:
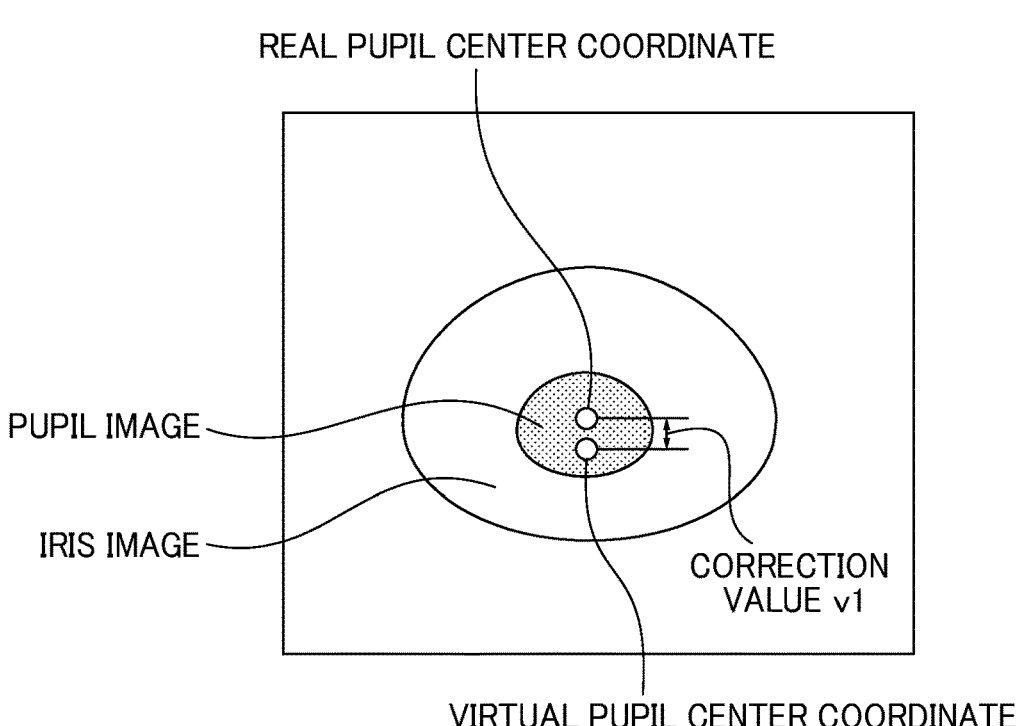
FIG. 10A is a schematic view describing how to correct a coordinate of a pupil center on the basis of a pupil diameter (when the pupil diameter is small) with the camera according to the embodiment.
Figure 10B:
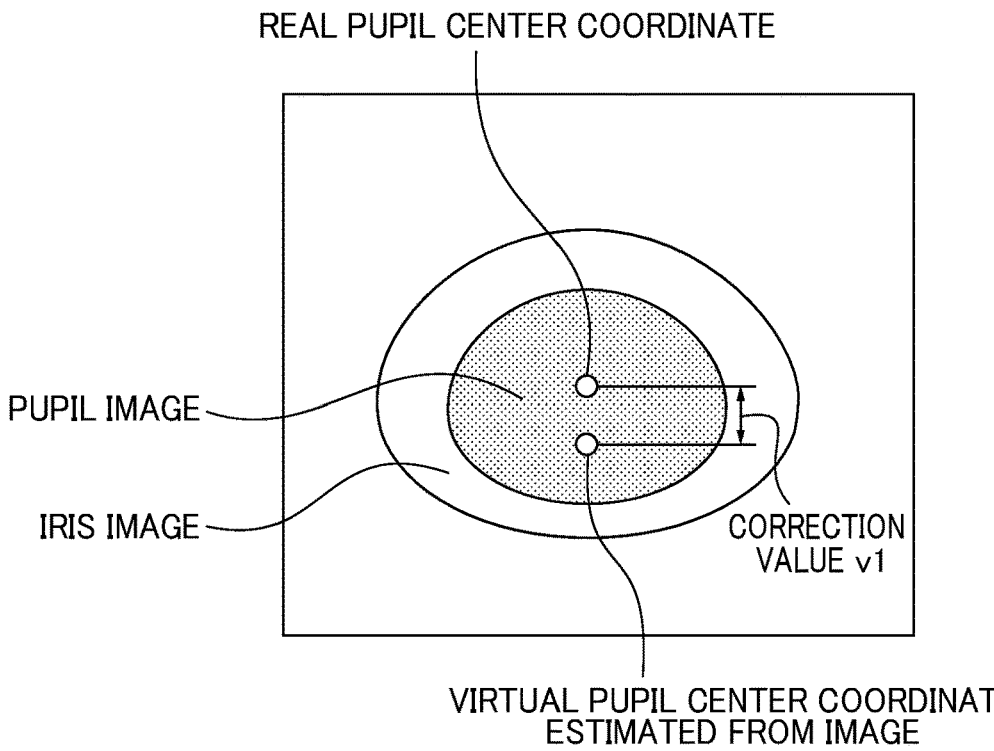
FIG. 10B is a schematic view describing how to correct a coordinate of a pupil center on the basis of a pupil diameter (when the pupil diameter is large) with the camera according to the embodiment.

FIG. 10A and FIG. 10B are views showing the pupil image and iris image of the eye image that are obtained by the sight line sensor 20. As mentioned above, the sight line sensor 20 is arranged at the position where the eyeball 21 is looked up from an oblique lower side in the off-axis sight line detection. Accordingly, as shown in FIG. 10A and FIG. 10B, the pupil image that is obtained by the sight line sensor 20 becomes downward swell. Accordingly, the coordinate of the temporary pupil center c' detected from the pupil image (eye image) by the pupil center detector 208 is not coincident to the coordinate of the actual (i.e., correct) pupil center c. Accordingly, the gaze point correction unit 210 in the sight line detector 201 corrects the coordinate of the pupil center c' by calculating a correction value v1. As mentioned above, the sight-line/gaze-point detector 209 detects (presumes) a gaze point. Then, in this embodiment, the coordinate (Hx, Hy) of the gaze point shall be the coordinates corresponding to the pupil center c'.

A human is adjusting an amount of light that reaches a retina by changing a pupil diameter according to light intensity. To strong light, the pupil 212 becomes small (see FIG. 10A). In the meantime, to weak light, the pupil 212 becomes large (see FIG. 10B). The distance (hereinafter referred to as the "inter-coordinate distance") between the coordinate of the temporary pupil center c' estimated from the image and the coordinate of the pupil center c depends on the pupil diameter. Then, the inter-coordinate distance correlates to the pupil diameter. The inter-coordinate distance can be equivalent to the correction value v1. Thereby, the correction value v1 is calculated on the basis of the pupil diameter of the user. Moreover, the correction value v1 is expressed by the following formula (4) using the radius r of the pupil 212 and the angle θ 24 formed between the optical axis O22 of the sight-line detection optical system 19 and the direction of the sight line O23.

$$v1 = f(\theta 24, r) \tag{4}$$

The function f finds the correction value V1 so as to be proportional to the angle θ24 and radius r. Moreover, if the function f includes a coefficient, the coefficient is calculated on the basis of simulation or data obtained experimentally, and is held as a value inherent to the camera.

Then, the gaze point correction unit 210 moves the coordinate (Hx, Hy) of the gaze point that is the coordinate corresponding to the pupil center c' by the correction value v1. The coordinate of the movement destination becomes the coordinate of the actual pupil center c. In this way, the gaze point correction unit 210 in the sight line detector 201 corrects the position of the pupil center c' (gaze point) on the basis of the angle θ 24 and pupil diameter. Thereby, even in the off-axis sight line detection, the actual pupil center c (gaze point) is detectable with high accuracy. The method and configuration for detecting the pupil diameter are not limited. For example, the pupil center detector 208 may be constituted so as to detect the pupil diameter. In this case, |Xa–Xb| can be considered as the pupil diameter.

Moreover, since the position of the pupil center c' is specified at one point within the eye image, arithmetic load is reduced as compared to the method that calculates a pupil center position after respectively finding points in the real space corresponding to all the points of the edge coordinate group of the pupil image, for example. This enables quick detection of the pupil center c'. Moreover, although the coordinate of the temporary pupil center c' is estimated from the feature point (luminance gravity center) of the pupil image in this embodiment, the estimation method is not limited to this. Moreover, the feature point it is not limited to the luminance gravity center. For example, a geometrical center point of the pupil image may be the feature point.

Figure 11A:
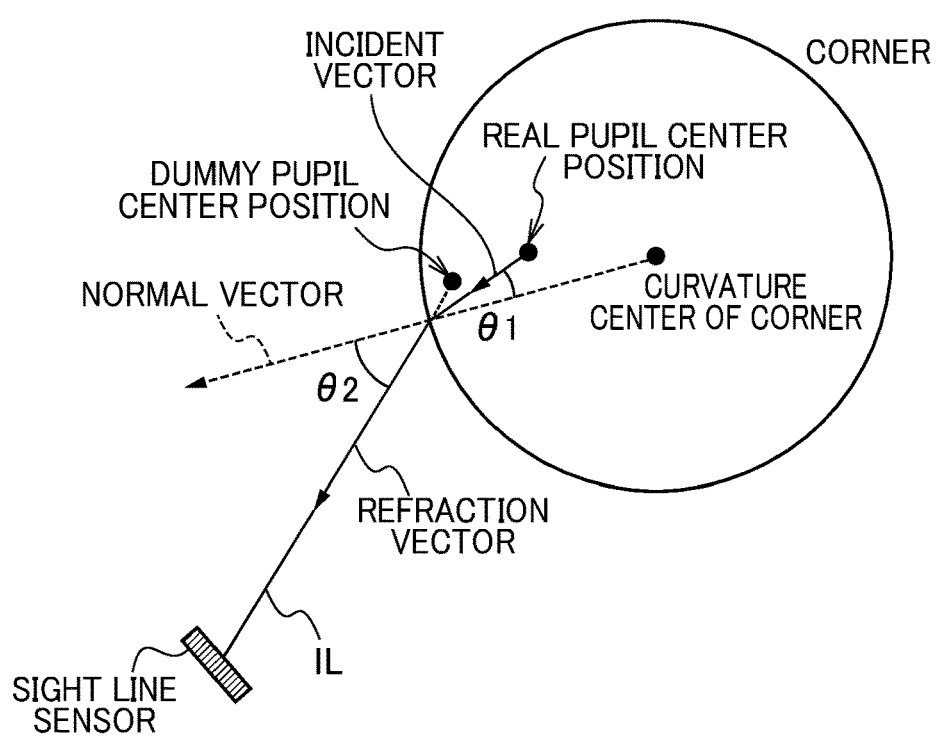
FIG. 11A is a sectional view showing refraction of light by the cornea in a YZ plane that is formed by a Y-axis and a Z-axis and that cuts the sight line sensor of the camera according to the embodiment and a user's cornea.
Figure 11B:
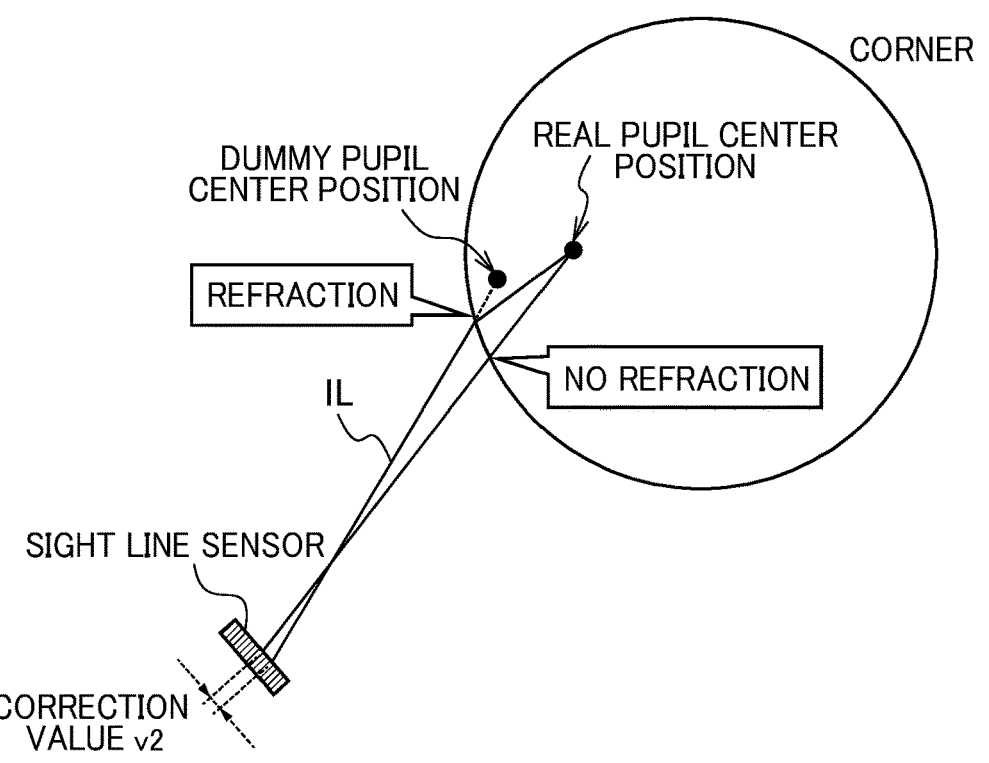
FIG. 11B is a schematic view describing how to correct deviation of the coordinate of the pupil center due to the refraction by the cornea with the camera according to the embodiment.

Since the refractive index inside the cornea differs from the refractive index of outside air, the infrared light ray IL is refracted at the boundary between the cornea and the outside air as shown in FIG. 11A and FIG. 11B. For this reason, an actual pupil center position is not coincident to an apparent pupil center position. The infrared light ray IL is refracted at the boundary so that a refractive vector may satisfy the Snell's law (law of refraction) to an incident vector and a normal vector. The Snell's law is expressed by the following formula (5) using the refractive index N1 of the cornea 211 and the refractive index N2 of air.

$$N1 \cdot \sin \theta 1 = N2 \cdot \sin \theta 2 \tag{5}$$

Where θ1 is an incident angle from the inside of the cornea to air and θ2 is a refraction angle from the inside of the cornea to air.

Accordingly, the incident vector can be calculated using the refractive index of the cornea 211, the refractive vector, and the normal vector, and the actual pupil center position can be found. The sight line detector 201 can detect the position of the actual pupil center c in the real space in consideration of the refraction by the cornea 211 by correcting the coordinate of the pupil center c' in the eye image (i.e., the apparent pupil center position) using the correction value v2. The correction value v2 is calculated on the basis of the angle θ24 that is formed between the optical axis O22 of the sight-line detection optical system 19 and the direction of the sight line O23 (an optical axis of the display optical system: the direction of the sight line when the user gazes at the center of the display unit). The correction value v2 is expressed by the following formulas (6) using the angle θ24.

$$v2 = g(\theta 24, \theta 1) \tag{6}$$

The function g finds the correction value v2 so as to be proportional to the angle θ24 and the incident angle θ1. It should be noted that the angle θ24 is a fixed value. Moreover, if the function g includes a coefficient, the coefficient is calculated on the basis of simulation or data obtained experimentally, and is held as a value inherent to the camera.

Then, the gaze point correction unit 210 moves the coordinate (Hx, Hy) of the gaze point that is the coordinate corresponding to the pupil center c' by the correction value v2. The coordinate of the movement destination becomes the coordinate of the actual pupil center c (the gaze point). In this way, the gaze point correction unit 210 in the sight line detector 201 corrects the position of the pupil center c' (gaze point) on the basis of the angle θ 24, the refractive index of the cornea 211, and the refractive index of air. Thereby, the actual pupil center c is detectable with high accuracy even in the off-axis sight line detection as with the case where the correction value v1 is used. It should be noted that the storage unit 4 preferably stores the refractive index of the cornea 211 of the eyeball 21 and the refractive index of air beforehand. Thereby, the correction value v2 is promptly computable.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-153365, filed Sep. 21, 2021, which is hereby incorporated by reference herein in its entirety.

What is claimed is:

1. A detection device comprising:
    an obtainment unit including a sight-line detection optical system and a sight line sensor, located on a lower side relative to a direction of a sight line of a user viewing a display;
    a memory device that stores a set of instructions; and
    at least one processor that executes the set of instructions to:
    obtain an image of an eyeball of the user by the obtainment unit;
    detect a position of an apparent pupil center of the eyeball from the image;
    detect the direction of the sight line of the user based on the position of the apparent pupil center;
    calculate a position of an actual pupil center of the eyeball of the user based on an incident vector of a light ray entering the position of the actual pupil center from a cornea of the eyeball, calculated using Snell's law, and on an angle between an optical axis of the sight-line detection optical system and the detected direction of the sight line; and
    calculate a correction value of the calculated position of the actual pupil center based on a pupil diameter of the eyeball and the angle between the optical axis of the sight-line detection optical system and the detected direction of the sight line.

2. The detection device according to claim 1, further comprising a storage configured to store a refractive index of the cornea of the eyeball and a refractive index of air,
    wherein the at least one processor executes instructions in the memory device to detect the position of the actual pupil center using the refractive index of the cornea of the eyeball and the refractive index of air.

3. The detection device according to claim 1, wherein the at least one processor executes instructions in the memory device to:
    detect a position of a curvature center of the cornea of the eyeball from the image; and
    detect the direction of the sight line using the position of the curvature center of the cornea.

4. The detection device according to claim 1, wherein the at least one processor executes instructions in the memory device to detect a position of a luminance gravity center of the image as the position of the apparent pupil center.

5. A control method for a detection device equipped with an obtainment unit, the obtainment unit including a sight-line detection optical system and a sight line sensor, located on a lower side relative to a direction of a sight line of a user viewing a display, the control method comprising:
    obtaining an image of an eyeball of a user by the obtainment unit;
    detecting a position of an apparent pupil center of the eyeball from the image;
    detecting the direction of the sight line of the user based on the position of the apparent pupil center;
    calculating a position of an actual pupil center of the eyeball of the user based on an incident vector of a light ray entering the position of the actual pupil center from a cornea of the eyeball, calculated using Snell's law, and on an angle between an optical axis of the sight-line detection optical system and the detected direction of the sight line; and
    calculating a correction value of the calculated position of the actual pupil center based on a pupil diameter of the eyeball and the angle between the optical axis of the sight-line detection optical system and the detected direction of the sight line.

6. A non-transitory computer-readable storage medium storing a control program causing a computer to execute a control method for a detection device equipped with an obtainment unit, the obtainment unit including a sight-line detection optical system and a sight line sensor, located on a lower side relative to a direction of a sight line of a user viewing a display, the control method comprising:
    obtaining an image of an eyeball of a user by the obtainment unit;
    detecting a position of an apparent pupil center of the eyeball from the image;
    detecting the direction of the sight line of the user based on the position of the apparent pupil center;
    calculating a position of an actual pupil center of the eyeball of the user based on an incident vector of a light ray entering the position of the actual pupil center from a cornea of the eyeball, calculated using Snell's law, and on an angle between an optical axis of the sight-line detection optical system and the detected direction of the sight line; and calculating a correction value of the calculated position of the actual pupil center based on a pupil diameter of the eyeball and the angle between the optical axis of the sight-line detection optical system and the detected direction of the sight line.

7. The detection device according to claim 1, wherein the at least one processor executes instructions in the memory device to:

calculate a correction value based on the incident vector of the light ray entering the position of the actual pupil center from the cornea of the eyeball, calculated using Snell's law, and on the angle between the optical axis of the sight-line detection optical system and the detected direction of the sight line, and move the position of the apparent pupil center by the correction value to calculate the position of the actual pupil center of the eyeball of the user.

8. The detection device according to claim 1, wherein the at least one processor further executes instructions in the memory device to:

detect the pupil diameter of the eyeball, calculate the correction value based on the detected pupil diameter, and correct said position of the actual pupil center of the eyeball using the correction value.

9. The detection device according to claim 1, wherein the pupil diameter is determined based on a distance between opposing edge coordinates of a pupil region in the image.

10. The detection device according to claim 1, wherein the pupil diameter is determined based on a luminance distribution output from the sight line sensor.

\*    \*    \*    \*    \*